(12) United States Patent
Hiraga et al.

(10) Patent No.: US 7,888,617 B2
(45) Date of Patent: Feb. 15, 2011

(54) CONTROLLER FOR WIRE-CUT ELECTRICAL DISCHARGE MACHINE

(75) Inventors: Kaoru Hiraga, Minamitsuru-gun (JP); Toshiyuki Ogata, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 398 days.

(21) Appl. No.: 12/044,184

(22) Filed: Mar. 7, 2008

(65) Prior Publication Data
US 2008/0251500 A1 Oct. 16, 2008

(30) Foreign Application Priority Data
Apr. 10, 2007 (JP) ............................. 2007-103249

(51) Int. Cl.
B23H 7/02 (2006.01)
B23H 7/20 (2006.01)
(52) U.S. Cl. .................................. 219/69.12; 219/69.16
(58) Field of Classification Search .............. 219/69.12, 219/69.16, 69.17; 700/162
See application file for complete search history.

(56) References Cited

U.S. PATENT DOCUMENTS

| | | | | |
|---|---|---|---|---|
| 5,021,622 A * | 6/1991 | Magara et al. | ............ | 219/69.12 |
| 5,041,984 A * | 8/1991 | Watanabe | .................... | 700/162 |
| 5,418,344 A * | 5/1995 | Magara et al. | ............ | 219/69.12 |
| 6,184,485 B1 * | 2/2001 | Day et al. | ................. | 219/69.12 |
| 6,897,397 B2 * | 5/2005 | Sato et al. | ................. | 219/69.12 |
| 6,924,453 B2 * | 8/2005 | Kawahara et al. | ......... | 219/69.12 |
| 2007/0140947 A1 | 6/2007 | Schneider et al. | | |
| 2008/0233041 A1 | 9/2008 | Jang et al. | | |

FOREIGN PATENT DOCUMENTS

| | | | |
|---|---|---|---|
| JP | 59-115125 A | | 7/1984 |
| JP | 1-140921 A | * | 6/1989 |
| JP | 04-217426 A | | 8/1992 |
| JP | 6040711 A | | 2/1994 |
| JP | 6080391 B | | 10/1994 |
| JP | 6087010 A | | 10/1994 |

(Continued)

OTHER PUBLICATIONS

Notice of Reasons for Rejection for Japanese Application No. 2007-103249 dated Jan. 15, 2009.
GCMEA (Global Congress on Microwave Energy Applications) Aug. 4-8, 2008 MAJIC 1st Proceedings, "The New Flame for Humanity".

(Continued)

*Primary Examiner*—Geoffrey S Evans
(74) *Attorney, Agent, or Firm*—Lowe Hauptman Ham & Berner LLP

(57) ABSTRACT

In a reference (n-th) machining pass, the wire travels along a machining route RTn and passes through a reentrant angular corner with wire position WMn, producing a workpiece edge Hn. In the following (n+1)-th machining pass, the wire travels along a machining route RTn+1, but the straight sections preceding and following the corner are replaced with a circular arc route so that the wire passes smoothly through a straight route, then a circular arc route, and then a straight route. The radius of curvature of the circular arc route is determined in the controller on the basis of the difference between the offset specified for the reference (n-th) machining pass and the offset specified for the (n+1)-th pass in which the circular arc route is inserted. Accordingly, the machining margin does not increase in the reentrant angular corner and the machining accuracy is thereby improved.

9 Claims, 13 Drawing Sheets

FOREIGN PATENT DOCUMENTS

| | | | | |
|---|---|---|---|---|
| JP | 07-009261 | A | | 1/1995 |
| JP | 2000-158235 | A | * | 6/2000 |
| JP | 2001-060105 | A | | 3/2001 |
| JP | 2002-011620 | A | | 1/2002 |
| JP | 2004-148472 | A | | 5/2004 |
| JP | 2007145674 | A | | 6/2007 |
| JP | 2007516923 | A | | 6/2007 |
| JP | 2008044840 | A | | 2/2008 |
| JP | 2008273807 | A | | 11/2008 |
| JP | 2008280195 | A | | 11/2008 |

OTHER PUBLICATIONS

Junfeng Geng et al., "Direct conversion of nickel stearate into carbon nanotubes or pure-phase metallic Ni nanoparticles encapsulated in polyhedral graphite cages," J. Matter Chem., Dec. 2004, 15, pp. 844-849.

Jin-Huan Huang et al., "Selective growth of carbon nanotubes on nickel oxide templates created by atomic force microscope nano-oxidation," Diamond & Related Materials, 14, Feb. 2005, pp. 744-748.

Chia-Chih Chuang et al., "The role of Ti interlayer in carbon nanotube growth," Surface & Coatings Technology, 202, Sep. 2007, pp. 2121-2125.

* cited by examiner

FIG. 5

```
O7510
G92X0.0Y0.0
S1D1G04X2.        ← D1:  OFFSET COMMAND
G91G01G40X0.Y6.   ← G40: OFFSET CANCEL COMMAND
G41Y-0.5          ← G41: LEFT-OFFSET COMMAND
X-4.
Y3.2679
X3.
X-3.Y1.7321
X3.
X-3.Y3.
X3.
Y2.
X4.
Y-2.
X3.
X-3.Y-5.1962
X3.
Y-2.8038
X-4.
G40Y0.5           ← G40: OFFSET CANCEL COMMAND
Y-2.
M30
```

FIG. 6

| OFFSET MEMORY1  | OFFSET MEMORY2  | OFFSET MEMORY3  | OFFSET MEMORY4  | OFFSET MEMORY5  |
|-----------------|-----------------|-----------------|-----------------|-----------------|
| OFFSET MEMORY6  | OFFSET MEMORY7  | OFFSET MEMORY8  | OFFSET MEMORY9  | OFFSET MEMORY10 |
| OFFSET MEMORY11 | OFFSET MEMORY12 | OFFSET MEMORY13 | OFFSET MEMORY14 | OFFSET MEMORY15 |
| OFFSET MEMORY16 | ............... |                 |                 |                 |

FIG. 8

```
O7511
G92X0.0Y0.0
S1D1G04X2.
G91G01G40X0.Y6.
G41Y-0.5
X-4.
Y3.2679
X3. R0.5          ← R0.5: CORNER R COMMAND (CORNER [1])
X-3.Y1.7321
X3. R0.5          ← R0.5: CORNER R COMMAND (CORNER [2])
X-3.Y3.
X3. R0.5          ← R0.5: CORNER R COMMAND (CORNER [3])
Y2.
X4.
Y-2. R0.5         ← R0.5: CORNER R COMMAND (CORNER [4])
X3.
X-3.Y-5.1962 R0.5 ← R0.5: CORNER R COMMAND (CORNER [5])
X3.
Y-2.8038
X-4.
G40Y0.5
Y-2.
M30
```

FIG. 12A

```
            EXAMPLE OF MAIN PROGRAM
O7515
S1D1G04X2.      ← D1: OFFSET COMMAND FOR FIRST MACHINING PASS
M98P7516        ← INVOKE SUBPROGRAM FOR FIRST MACHINING PASS

S2DD2G04X2.     ← DD2: OFFSET COMMAND FOR REFERENCE MACHINING PASS
M98P7516        ← INVOKE SUBPROGRAM FOR SECOND MACHINING PASS

S3D3G04X2.      ← D3: OFFSET COMMAND FOR THIRD MACHINING PASS
M98P7516        ← INVOKE SUBPROGRAM FOR THIRD MACHINING PASS

S1G04X2.
M98P7517        ← INVOKE SUBPROGRAM FOR CUT OFF
M30                                    (OMITTED)
```

FIG. 12B

```
            EXAMPLE OF SUBPROGRAM
O7516
G92X0.0Y0.0
G91G01G40X0.Y6.  ← G40: OFFSET CANCEL COMMAND
G41Y-0.5         ← G41: LEFT-OFFSET COMMAND
X-4.
Y3.2679
X3.        ⎫
X-3.Y1.7321⎭  REENTRANT ANGULAR CORNER [1]
X3.        ⎫
X-3.Y3.    ⎭  REENTRANT ANGULAR CORNER [2]
X3.        ⎫
Y2.        ⎭  REENTRANT ANGULAR CORNER [3]
X4.
Y-2.       ⎫
X3.        ⎭  REENTRANT ANGULAR CORNER [4]
X-3.Y-5.1962⎫
X3.         ⎭  REENTRANT ANGULAR CORNER [5]
Y-2.8038
X-4.
G40Y0.5          ← G40: OFFSET CANCEL COMMAND
Y-2.
M99
```

CONTROLLER FOR WIRE-CUT ELECTRICAL DISCHARGE MACHINE

RELATED APPLICATIONS

The present application is based on, and claims priority from, Japanese Application Number 2007-103249, filed Apr. 10, 2007, the disclosure of which is hereby incorporated by reference herein in its entirety.

BACKGROUND OF THE INVENTION

1. Field of the Invention

The present invention relates to a controller for controlling wire cut electrical discharge machines to improve their machining accuracy in reentrant angular corners.

2. Description of the Related Art

In machining using a wire cut electrical discharge machine, if the wire electrode (hereinafter referred to simply as the wire) follows the unaltered route specified by a machining program, the resulting contour (machined route) of the workpiece deviates from the specified route.

This fact, which is well known in the art, is mainly due to the non-negligible radius R of the wire and the discharge gap $\Delta gp$. More specifically, the wire route differs from the machining route by an amount equal to the wire radius R plus the discharge gap $\Delta gp$, and the dimensions of the machined workpiece are reduced accordingly.

A basic approach taken to avoid this problem is to create an offset machining route by offsetting the route specified by the machining program by an amount equivalent to the wire radius R plus the discharge gap $\Delta gp$ and move the wire along the offset machining route. Multi-pass machining techniques in which this idea of wire offset is adopted are also known.

Multi-pass machining is a technique in which the entire machining process for obtaining the intended contour line (machined route) is divided into a plurality of machining passes with contour lines (machined routes) that progressively approach the final contour line (machined route), the machining route in each pass being selected so that the contour line obtained in the final machining pass reaches matches the intended contour line as closely as possible. In theory, the problem of the deviation of the actual machined contour from the machining route specified by the machining program can be solved by gradually reducing the offset from one pass to the next (gradually approaching or reaching $R+\Delta gp$), as if peeling off a succession of skins.

If this technique is applied to the machining of reentrant angular corners, however, it becomes difficult to achieve high machining accuracy. A reentrant angular corner is one type of corner shape created in wire cut electrical discharge machining. The various types of inside and outside corner shapes created by wire cut electrical discharge machining include arcs, right angles, acute angles, and obtuse angles; the type which will be referred to hereinafter as a reentrant angular corner is an inside corner formed by two intersecting straight blocks, The reason why multi-pass machining has difficulty reaching high accuracy in a reentrant angular corner is that due to the offset, as the corner angle decreases, the machining depth increases, and in the finishing process (the final machining pass or the final few machining cycles) in multi-pass machining a very low discharge energy is usually used to obtain a good surface finish, as if peeling a thin skin. The machining depth in the finishing of a reentrant angular corner may therefore exceed the machining capacity of the discharge energy, in which case the wire and the workpiece will become short-circuited, resulting in erratic machining and poor accuracy.

A typical control technique for avoiding such short-circuiting reduces the machining speed in reentrant angular corners, but it is difficult to determine the exact speed needed because there are several factors involved, including the corner angle and electrical conditions. If the speed is not reduced enough, short-circuiting will occur; if the speed is reduced too much, the electrical discharge will be over-concentrated and the workpiece will be over-machined. Attempts have been made to solve these problems by providing several parameters that can be set to address various assumed situations, but this approach is unacceptable in practice because as the number of assumed situations is increased to improve controllability, a huge amount of time and effort is required to determine the correct parameter settings.

The above problem does not occur in reentrant circular arc corners, because the machining routes are concentric, so the machining depth is no greater than in the machining of straight sections, even if the offset is different in each machining pass.

Known documents discussing the above problem in multi-pass machining of reentrant angular corners include the following, which are listed below with brief outlines of their contents.

(1) Japanese Patent Application Laid-Open No. 59-115125 discloses a method for correcting a wire-cut shape by adding circular arc routes in machined reentrant angular corners. In the wire-cut shape correction method disclosed in this patent document, when the machining routes specified by two instruction blocks in the basic program intersect to form a reentrant angular corner, a circular arc machining route centered at the block intersection and having a radius equivalent to the offset of the wire electrode from the machining route is added to the reentrant angular corner.

The intent of the method described in this patent document is to have the first machining pass remove the rounded portions generated in reentrant angular corners, which cause a problem in the machining of dies or the like, by adding a circular arc machining route having a radius equal to the offset on the workpiece side, centered at the block intersection point. This circular arc route is used to gouge the workpiece in the first machining pass and is not designed to increase the machining accuracy in the corner. Accordingly, the technique shown in this patent document addresses a different problem from that of the present invention, which is described below.

(2) Japanese Patent Application Laid-Open No. 2002-011620 discloses an attempt to machine a workpiece into a desired shape by changing the machining conditions at appropriate points in a wire cut electrical discharge machining process that allows the machining conditions to be changed in ways that cause variations in the discharging gap of the wire electrode. According to this patent document, if the offset is changed at the point at which two blocks are connected, a correction block is inserted at the point at which the machining route becomes discontinuous and an appropriate timing is set at which to change the machining conditions. The technique shown in this patent document does not address the problem of the increased machining depth due to the offset in reentrant angular corners and is again different from the technique of the present invention.

(3) Japanese Patent Application Laid-Open No. 2004-148472 discloses a method for changing the feed speed at appropriate points in the finishing stage of reentrant angular corners to solve the above problem. More specifically, in the finishing stage, the feed speed is changed at four points: a first point at which the machining removal distance in an offset path offset from a predetermined path starts to increase or decrease in relation to the machining removal distance in a straight line; a second point at which the machining removal distance ceases to change after the wire electrode has passed the first point; a third point at which the machining removal distance starts to decrease or increase after the wire electrode has passed the second point; and a fourth point at which the machining removal distance becomes equal to the distance removed in machining a straight line after the wire electrode has passed the third point. Then, the machining removal distance is calculated at intervals of a predetermined unit distance between the first point and the fourth point, and an appropriate feed speed is determined from each calculated machining removal distance, so that the feed speed is appropriately changed for each unit distance between the first point and the fourth point.

The technique disclosed in this patent document addresses the same problem as the present invention, but attempts to solve the problem by controlling the machining speed, so it is different from the solution provided by the present invention.

(4) Japanese Patent Application Laid-Open No. H04-217426 discloses a technique for improving the shape accuracy of a corner which is specified as a circular arc route in a machining program. More specifically, as the machining process proceeds from rough machining to finish machining, if a circular arc in the shape to be machined has a radius smaller than a preset reference radius, the circular section is first machined along a route in which arcs with a radius smaller than the intended radius are inserted, tangent to the machining routes at both ends of the intended arc, and then the machining route is modified by gradually increasing the radius of the arcs to be inserted.

The technique disclosed in this patent document attempts to minimize the machining depth in the finishing stage by cutting as deeply as possible into the corner in the rough machining stage, so it addresses a problem different from that of the present invention, which is directed toward the improvement of machining accuracy in reentrant angular corners (i.e., corners having a reentrant angular route in the machining program). The technique in this patent document looks similar to the present invention regarding the insertion of a circular arc route, but differs completely from the present invention in the way the circular arc machining route is determined. The present invention determines the circular arc machining route from the offset difference as described later.

(5) Japanese Patent Application Laid-Open No. 07-009261 discloses another technique for improving the shape accuracy of a corner which is specified as a circular arc route in a machining program. More specifically, the technique disclosed in this patent document attempts to minimize the minimum machinable radius in reentrant angular corners by creating machining routes with the same radius in each machining step. To do this, the locus of movement in inside corners in each machining step is calculated so that the circular arc loci produce the same radius in inside-corner machining in machining steps with different offsets, and the locus of movement is controlled based on the calculation result so that the inside-corner radius becomes equal in each machining step.

In contrast, the present invention attempts to improve the shape accuracy of corners that are specified as reentrant angular routes in the machining program and the circular arc machining route to be inserted has a different radius in each machining pass. In the technique described in this patent document, as can be seen from FIG. 2, the machining margin is clearly greater in a reentrant angular corner than in a straight section. Unlike the above technique, the present invention attempts to make the machining margin in reentrant angular corners equal to that in straight sections, as described later.

SUMMARY OF THE INVENTION

In view of the situation described above, the present invention attempts to facilitate the improvement of machining accuracy in multi-pass machining of reentrant angular corners by solving problems due to the increased machining depth in reentrant angular corners.

The present invention solves the above problems by focusing on the machining characteristics of multi-pass machining in reentrant angular corners and providing a controller capable of automatically correcting the machining route to prevent the machining depth from increasing in reentrant angular corners. The controller removes machining route sections preceding and following the vertex of a reentrant angular corner (by removing sections of two straight motion blocks) and inserts a single circular arc route having a radius determined on the basis of the offset difference in place of the removed sections.

To achieve the above object, according to a first embodiment of the present invention, a controller for controlling multi-pass machining by a wire cut electrical discharge machine includes machining program storage means for storing machining programs, machining program analyzing means for analyzing the machining programs stored in the machining program storage means, offset storage means for storing the wire offset set for each machining pass, machining route creating means for creating a machining route on the basis of the result of analysis by the machining program analyzing means and the offset stored in the offset storage means, machining route correcting means for correcting the machining route in reentrant angular corners formed by two intersecting straight motion blocks that are not parallel to each other, reference machining pass setting means for setting a reference machining pass to determine the machining pass in which the machining route correcting means starts to correct the machining route, and offset difference calculating means for calculating the difference between the offset for the reference machining pass and the offset for the next or a later machining pass. The machining route correcting means corrects the machining route created by the machining route creating means by removing, from the two straight motion blocks forming each reentrant angular corner, sections adjacent to the vertex of the reentrant angular corner and inserting, in place of the removed sections, a circular arc motion block having a radius of curvature determined on the basis of the difference calculated by the offset difference calculating means.

The radius of curvature of the circular arc motion block may be made equal to the offset difference calculated by the offset difference calculating means. The circular arc motion block may be inserted into the machining route so as to make tangential contact with the two straight lines.

Furthermore, to produce in the controller a machining route having a circular arc motion block inserted (straight route→circular arc route→straight route), a machining route with a circular arc motion block inserted may be created by the machining route creating means, instead of a route being created by the machining route creating means and then corrected by the machining route correcting means which inserts a circular arc motion block.

According to a second embodiment of the present invention, a controller for controlling multi-pass machining by a wire cut electrical discharge machine includes machining program storage means for storing machining programs, machining program analyzing means for analyzing the machining programs stored in the machining program storage means, offset storage means for storing the wire offset for each machining pass, reference machining pass setting means for setting a reference machining pass to determine the machining pass in which machining route correction is initiated for reentrant angular corners formed by two intersecting straight motion blocks specified by the machining program, by removing from these two straight motion blocks sections adjacent to the vertex of the reentrant angular corner and inserting a circular arc motion block instead, offset difference calculating means for calculating the difference between the offset for the reference machining pass and the offset for the next or a later machining pass, and machining route creating means for creating a machining route by receiving the offset from the offset storage means and the analysis result from the machining program analyzing means, removing, from the two straight motion blocks forming each reentrant angular corner, sections adjacent to the vertex of the reentrant angular corner, and inserting a circular arc motion block having a radius of curvature determined on the basis of the difference calculated by the offset difference calculating means into the reentrant angular corner in place of the removed sections.

Here, the radius of curvature of the circular arc motion blocks can be made equal to the offset difference calculated by the offset difference calculating means. The circular arc motion block may be inserted into the machining route so as to make tangential contact with the two straight lines.

According to the present invention, the machining depth does not increase in multi-pass machining in reentrant angular corners, so the machining accuracy in reentrant angular corners can easily be improved. Because the machining depth is moderate, short-circuits rarely occur and finishing can be carried out without difficulty even with low discharge energy. Special speed control or other means (for reducing the speed of motion of the wire, for example) is no longer required to prevent the problems caused by increased machining depth.

BRIEF DESCRIPTION OF THE DRAWINGS

The above and other objects and features of the present invention will be apparent from the following description of the embodiments with reference to the accompanying drawings, in which:

FIG. 5 shows an example of machining program for obtaining the machined shape shown in FIG. 4;

FIG. 6 is a table showing an example of memory configuration of an offset storage means for storing offsets;

FIG. 8 shows an example of machining program for obtaining the machined shape shown in FIG. 7;

FIGS. 12A and 12B show an example of machining program for obtaining the machined shape shown in FIG. 11;

DETAILED DESCRIPTION OF THE PREFERRED EMBODIMENTS

The present invention is directed to enhancing the finishing accuracy in multi-pass machining in reentrant angular corners (corners with angles of up to 180 degrees) formed by two intersecting straight blocks, and in particular is directed to solving the problem by focusing on the machining characteristics of multi-pass machining in reentrant angular corners and devising a machining route modification including the insertion of a circular arc motion block (also referred to hereinafter simply as an "circular arc block").

First, the problem that arises in the machining of reentrant angular corners and the principle used to solve this problem will be described with reference to FIGS. 1 to 3.

Figure 1:
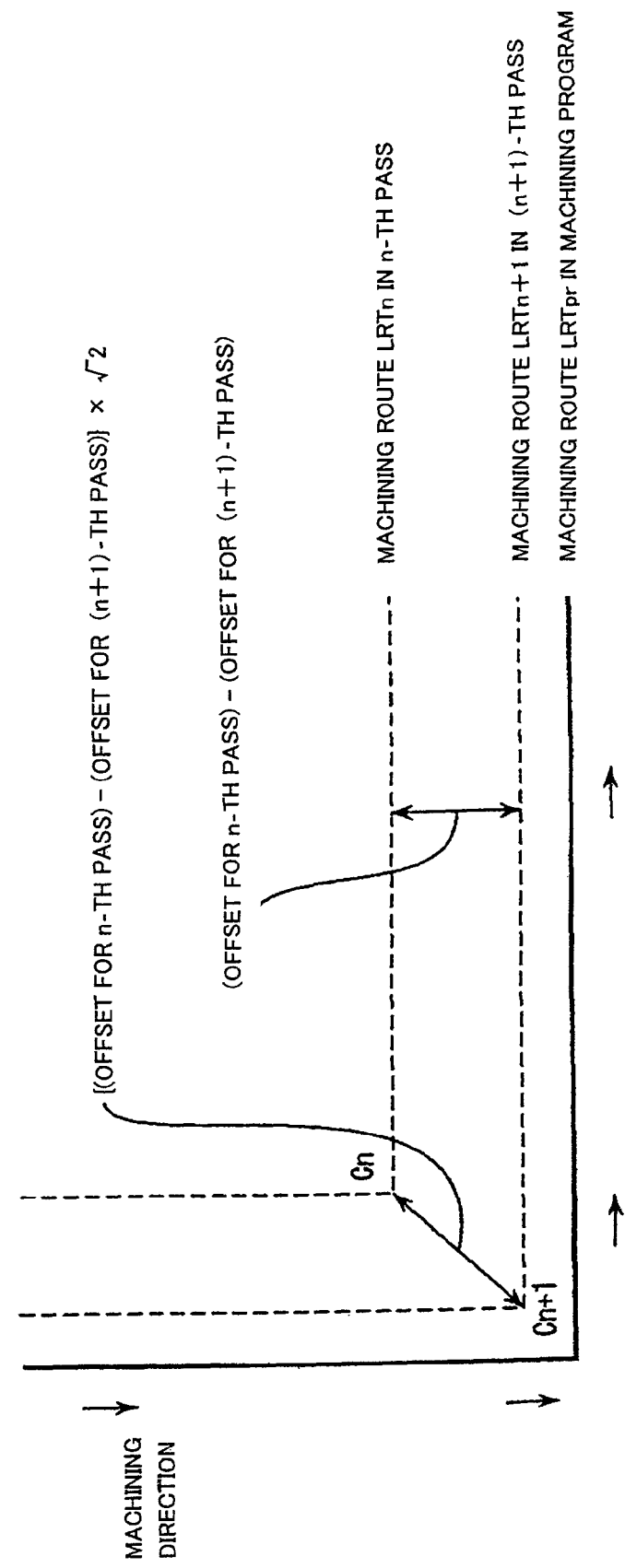
FIG. 1 shows typical machining routes for multi-pass machining in a reentrant angular corner.

FIG. 1 shows a typical machining route for multi-pass machining in a reentrant angular corner. The reentrant angular corner shown in this example is a bend in a machining route LRTpr in a machining program, formed by two straight blocks intersecting at a right angle. When multi-pass machining is applied to this reentrant angular corner, the wire travels along the machining route with an offset that gradually decreases as the machining progresses from the first pass toward the final pass.

FIG. 1 shows the machining route $LRTn$ for the n-th ($n \geq 1$) machining pass and the machining route $LRTn+1$ for the (n+1)-th machining pass. It should be noted here that the distance between the machining routes $LRTn$ and $LRTn+1$ (distance between machining routes) in the straight sections is different from the distance at the vertex of the reentrant angular corner. More specifically, the distance between the machining routes in the straight sections is the offset of machining route $LRTn$ minus the offset of machining route $LRTn+1$ (the difference between the two offsets), while the distance between the machining routes at the vertex of the reentrant angular corner is the distance between the bend $Cn$ of machining route $LRTn$ and the bend $Cn+1$ of machining route $LRTn+1$, i.e., the difference between the two offsets multiplied by the square root of two.

The distance between the machining routes at the vertex of this reentrant angular corner represents the machining depth required in this reentrant angular corner in the (n+1)-th machining pass and is approximately 1.41 times the machining depth required in the straight sections (the distance between the machining routes).

The machining depth or "machining margin" in each machining pass (first, second, and so on) in multi-pass machining is generally greater in a reentrant angular corner than in a straight section: approximately 1.41 times as great in the example in FIG. 1 (where the reentrant angular corner is formed by two straight blocks intersecting at 90 degrees). In a reentrant angular corner formed by two straight lines intersecting at an angle less than 90 degrees, the machining margin obviously becomes even greater and more difficult to machine.

Figure 2:
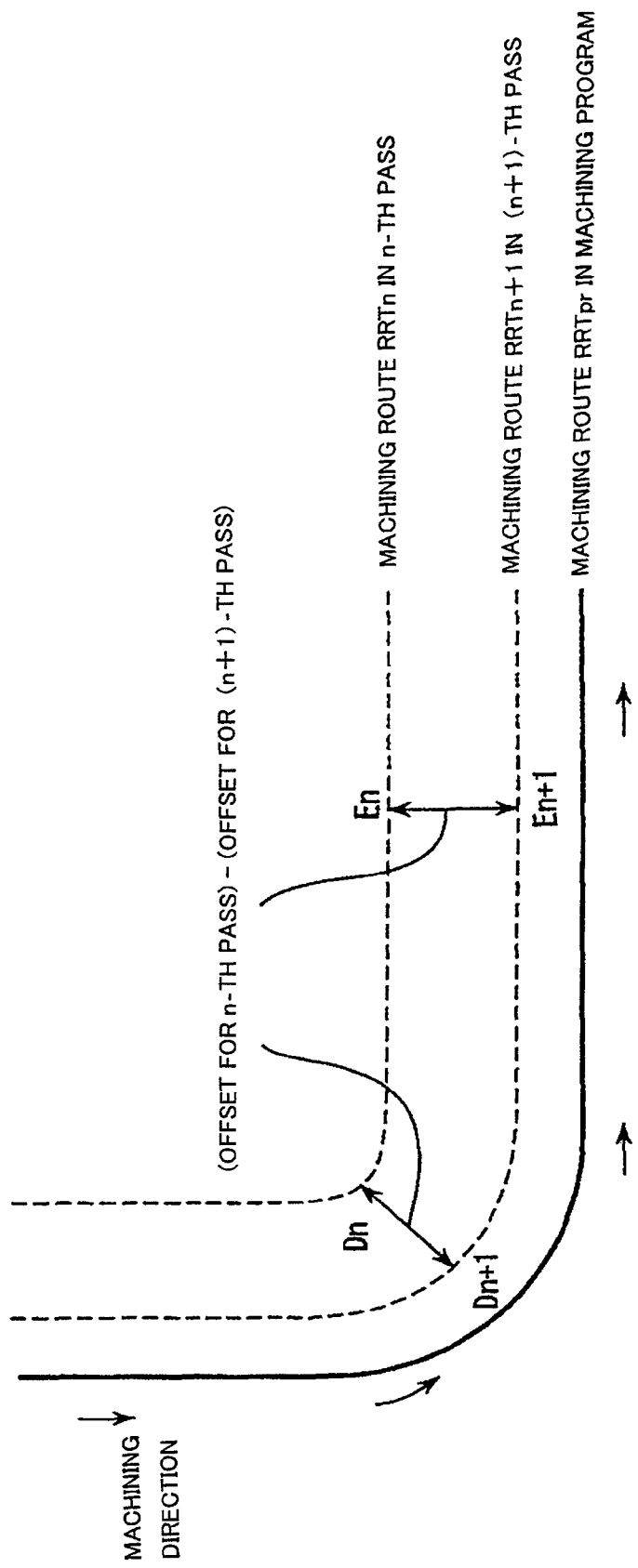
FIG. 2 shows typical machining routes for multi-pass machining in a reentrant circular arc corner.

In contrast, as can be seen from the example shown in FIG. 2, this problem does not arise in reentrant circular arc corners. FIG. 2 shows typical machining routes for multi-pass machining of a reentrant circular arc corner, formed by a machining route RRTpr in a machining program that smoothly connects two straight blocks with a circular arc block for machining the workpiece into a reentrant circular arc shape between the straight blocks. As in the case of a reentrant angular corner, when multi-pass machining is applied to reentrant circular arc corners, machining is performed successively along the machining routes RRTn, RRTn+1 . . . with the offset gradually decreasing from the first pass to the final pass.

In a reentrant circular arc corner, however, the distance between the n-th machining route RRTn and the (n+1)-th machining route RRTn+1 (distance between machining routes) in the straight sections does not differ from the distance in the reentrant circular arc corner. The distance between the machining routes in the straight sections, i.e., the distance between a given point En in the straight section of machining route RRTn and the corresponding point En+1 in the straight section of machining route RRTn+1 is equal to the difference in offset between machining routes RRTn and RRTn+1. Similarly, the distance between the machining routes in the reentrant circular arc corners, i.e., the distance between a given point Dn in the circular arc section of machining route RRTn and the corresponding point En+1 in the circular arc section of machining route RRTn+1, is equal to the difference in offset between machining routes RRTn and RRTn+1.

Since the distance between machining routes RRTn and RRTn+1 remains constant in both the straight sections and the reentrant circular arc corners, the machining depth or machining margin required in the (n+1)-th machining pass does not increase in the reentrant circular arc corners, so in principle, difficult machining situations do not arise.

As can be seen from the above description, multi-pass machining entails the problem of increased machining margin in the form of increased offset from the vertices of reentrant angular corners, but this problem does not arise in reentrant circular arc corners. The present invention solves the problem of reentrant angular corners by modifying the machining route by inserting appropriate circular arc blocks in the reentrant angular corners. The principle for solving this problem will be described with reference to FIG. 3.

Figure 3:
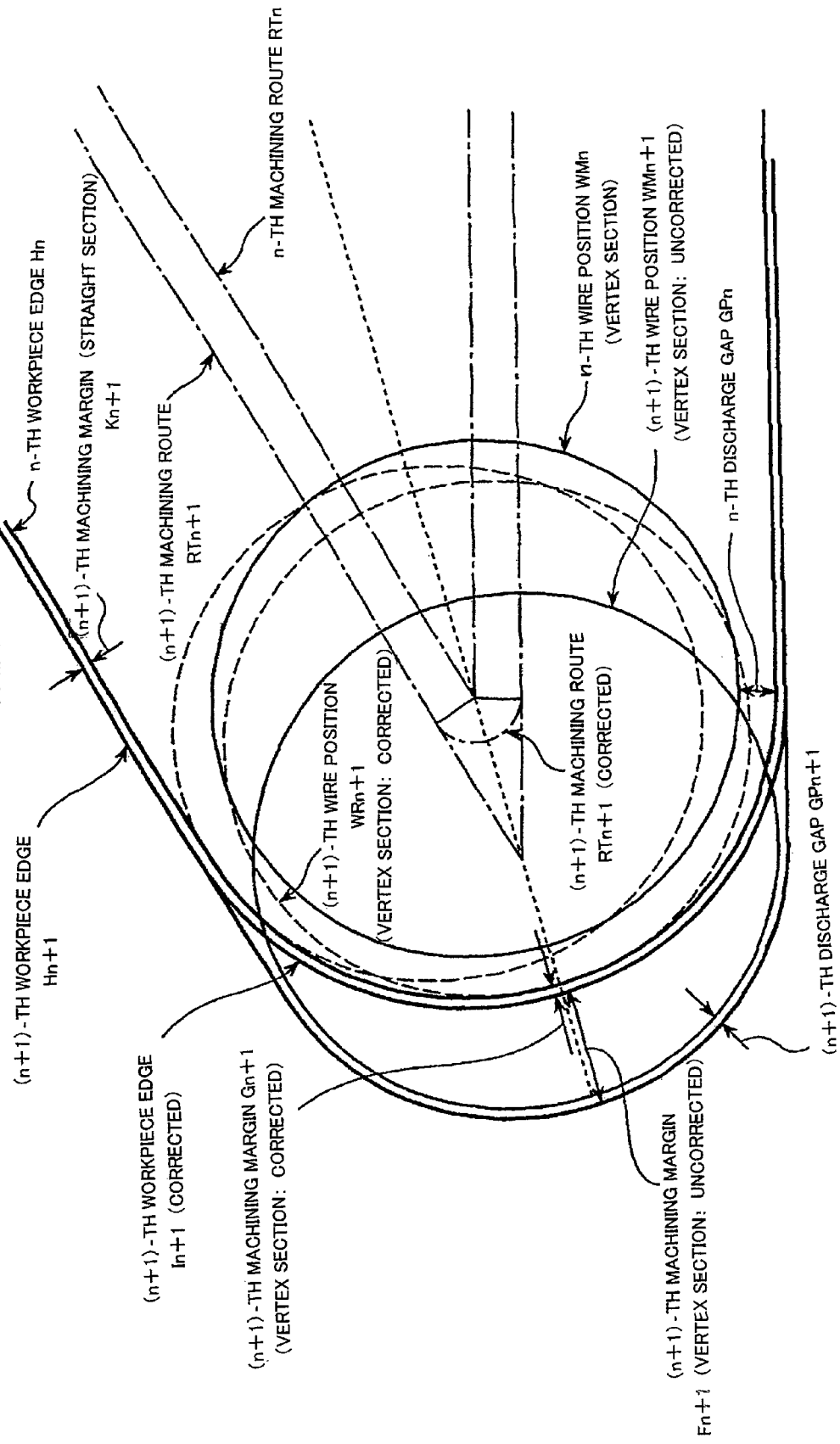
FIG. 3 illustrates wire positions and other details of multi-pass machining in a reentrant angular corner.

FIG. 3 illustrates wire positions (cross-sections of the wire) and other details of multi-pass machining in a reentrant angular corner.

In each machining pass in multi-pass machining, the wire is controlled so as to travel with respect to the workpiece along the machining route specified by the machining program, shifted by the offset defined for the current machining pass. Referring to the reentrant angular corner illustrated in FIG. 3, formed by two straight blocks intersecting at approximately 30 degrees, in the n-th (n≧1) machining pass, the wire produces an n-th workpiece edge Hn by discharging while traveling along the n-th machining route RTn and turning back at the n-th wire position WMn (vertex section) (i.e., passing through the reentrant angular corner). In this machining pass, an n-th discharge gap GPn is formed between the wire and the workpiece edge.

Next, in the (n+1)-th machining pass, the wire travels along the (n+1)-th machining route RTn+1, but in the reentrant angular corner the wire follows a route corrected or modified by a route correction (route modification) method according to the present invention.

For better understanding of the present invention, the case in which the route correction of the present invention is not applied will be described.

[Without Route Correction]

By discharging while skimming the n-th workpiece edge Hn up to a point immediately before entering the reentrant angular corner, the wire removes the (n+1)-th machining margin (straight section) Kn+1 as if peeling a thin skin. During this machining process, the (n+1)-th discharge gap GPn+1 is maintained and a straight section of the (n+1)-th workpiece edge Hn+1 is thereby formed. Then, as the wire travels further toward the vertex of the reentrant angular corner, because of the offset described above, the wire is forced to travel deep into the corner. The machining margin at this point reaches the (n+1)-th machining margin Fn+1 (vertex section: uncorrected) and the amount of material machined increases drastically, as compared with the amount in the straight section.

In the straight section, the wire discharges from a limited area of its side face, as if "licking" the n-th workpiece edge Hn. At the vertex of a narrow reentrant angular corner, the discharge takes place from approximately half of the wire surface; as a result, the discharge energy is insufficient for the amount of machining that must be done. The insufficient discharge energy causes the wire to crash into the unremoved portion of the workpiece. As a result, a short-circuit occurs, leading to unstable machining and thus poor machining accuracy.

As a countermeasure for avoiding this situation, a technique for controlling the machining speed in reentrant angular corners has been proposed but as noted above, it does not provide a sufficient solution.

[With Route Correction According to the Present Invention]

In view of the above problem that occurs when route correction is not applied, an appropriate solution would seem to be to prevent the machining margin from increasing at the vertices of reentrant angular corners. The present invention copes with this problem by replacing the straight sections adjacent to the vertex of a reentrant angular corner with a circular arc route having an appropriate radius of curvature to form a continuous smooth transition route between the straight sections. In other words, the straight sections adjacent to the vertex of the reentrant angular corner (i.e., the V-shaped route section that bends at the vertex) are removed and replaced with a circular arc motion block.

More specifically, the above "appropriate radius of curvature" may typically be the difference between the offset for the n-th machining pass and the offset for the (n+1)-th machining pass (i.e., the radius of curvature of the arc is equal to the difference in offset). In FIG. 3, an inserted circular arc route having a radius of curvature thus determined is shown as the (n+1)-th machining route (corrected) RTn+1 (indicated by the dot-dash line).

It should be noted that the above "appropriate radius of curvature" does not have to be equal to the difference between the offset for the n-th machining pass and the offset for the (n+1)-th machining pass; it may differ slightly from this difference. If the value of the "appropriate radius of curvature" differs from the above offset difference, there are two possible cases (A) and (B).

(A) Radius of Curvature>Difference in Offset

In this case, machining margin at a reentrant angular corner becomes smaller than in the case where the radius of curvature of the arc is equal to the difference in offset. Accordingly, an excessively large radius of curvature would probably lead to insufficient machining (the reentrant angular corner would be inadequately cut). The recommended upper limit of the practically permissible range is a radius of curvature not exceeding 1.2 times the offset difference.

(B) Radius of Curvature<Difference in Offset

In this case, machining margin at a reentrant angular corner becomes larger than in the case where the radius of curvature of the arc is equal to the difference in offset. Accordingly, an excessively small radius of curvature would reduce the effect of lessening a machining margin at a reentrant angular corner. The recommended lower limit of the practically permissible range is a radius of curvature not less than 0.5 times the offset difference.

More generally, the difference in offset can be the difference between the offset for the n-th machining pass and the offset for the (n+m)-th (m≧1) machining pass, instead of the difference between the offset for the n-th machining pass and the offset for the (n+1)-th machining as described above. For example, the radius of curvature of the circular arc motion block to be inserted may be determined based on the difference between the offset for the second machining pass and the offset for the fourth machining pass (n=2, m=2).

Furthermore, the circular arc route is preferably inserted so that the arc is tangent to the two straight routes forming the uncorrected (n+m)-th machining route. In this case, the points at which the straight lines make contact with the arc become the points of connection of the circular arc route to the straight routes, where the straight routes and the circular arc route are smoothly connected to each other without abrupt change in gradient in the route.

The V-shaped section projecting toward the vertex of the corner between the contact points in the machining route having the circular arc route inserted ((n+1)-th machining route RTn+1 in FIG. 3) is removed after the circular arc route ((n+1)-th machining route (corrected) RTn+1 in FIG. 3) is inserted (i.e., replaced).

The difference between the offset for the n-th machining pass and the offset for the (n+M)-th (m≧1) machining pass can be calculated in advance in the controller of the wire cut electrical discharge machine. The way the circular arc route is inserted into the (n+m)-th machining route will be described later.

After this route correction (route modification), the wire travels along a route including straight sections and an inserted circular arc section, such as the (n+1)-th route RTn+1 (after correction) in FIG. 3, shaving the n-th workpiece edge Hn by discharging. The amount of material removed by discharging in this machining pass is the (n+1)-th machining margin (straight section) Kn+1 in the straight section and the (n+1)-th machining margin Gn+1 (vertex section: corrected) in the reentrant angular corner. By traveling along the straight routes and the circular arc routes in the (n+1)-th machining pass, the wire produces the (n+1)-th workpiece edge (corrected) In+1. The wire position corresponding to the vertex of the reentrant angular corner is the (n+1)-th wire position WRn+1 (vertex section: corrected) indicated by a dotted circle in FIG. 3, which is set back from the (n+1)-th wire position WMn+1 (vertex section: uncorrected) indicated by a solid circle in FIG. 3 to show the wire position before route correction. Since the wire position at the deepest point of the reentrant angular corner in the (n+1)-th machining pass after route correction is set back from the corresponding wire position before route correction, the wire does not crash into the workpiece and short-circuit, and the associated poor machining accuracy can be avoided.

The concern may arise that this modification of the machining route will result in the workpiece being finished into a shape different from that specified in the drawings or instructions, but such a change in shape is usually not considered a problem in reentrant angular corners in wire cut electrical discharge machining. More specifically, in wire cut electrical discharge machining, the finished shape of the reentrant angular corner is inherently uncertain, because the wire has a circular cross-section and the machined shape in the reentrant angular corner inevitably becomes circular arc (even if a circular arc route is not inserted), deviating from the shape of the specified machining route, and the size of the arc is influenced by the diameter of the wire used, the discharge energy, the offset, and the corner angle.

In case where the finished shape of a reentrant angular corner has to be instructed precisely, a circular arc shape having a radius larger than the sum of the radius of the wire and the discharge gap is usually specified. Such specifying of circular arc shape may entail extra time and effort in creating the machining program. If the shape need not be precisely instructed or can be corrected by post-processing such as grinding, machining can be performed using a machining program that specifies a reentrant angular corner simply by two intersecting straight lines.

For such reasons, the machined shape required in a reentrant angular corner is a shape formed by two straight contours, which are formed by straight blocks without excessively or insufficiently removed portions, and a smooth circular arc section connecting the two straight contours. This requirement can fully be met by the above method according to the principle of the present invention.

If a corner section is formed with two intersecting straight blocks in a machining program, it is necessary to distinguish in advance whether the corner is a reentrant or salient angular corner before a circular arc route is actually inserted into the reentrant angular corner using the controller.

Figure 4:
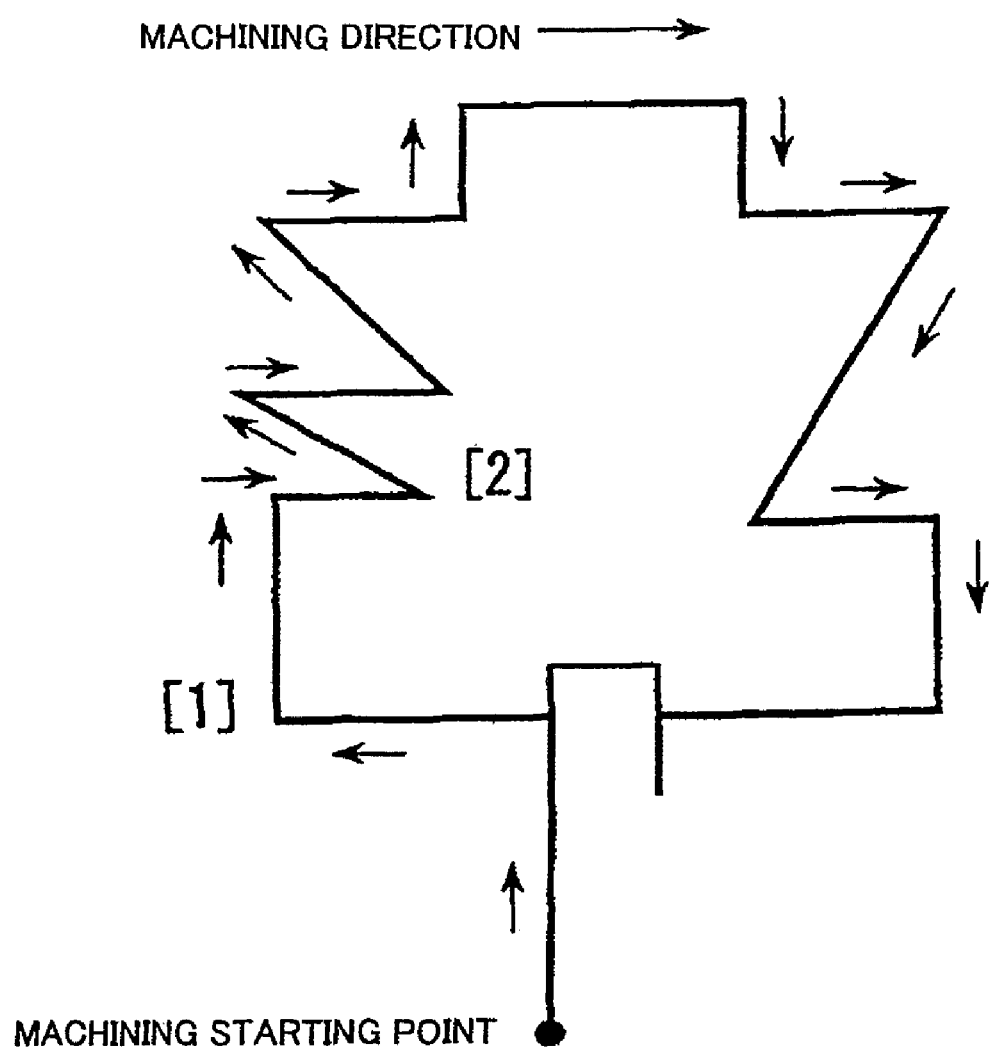
FIG. 4 shows an example of a shape machined by wire cut electrical discharge machining.

This distinction will be described with reference to FIGS. 4 to 6. FIG. 4 shows an example of a shape produced by wire cut electrical discharge machining. FIG. 5 is an example of machining program for obtaining the machined shape shown in FIG. 4. FIG. 6 shows an example of memory configuration of an offset storage means for storing offsets.

In FIG. 4, [1] indicates an example of salient angular corner; [2] indicates an example of reentrant angular corner. These salient and reentrant angular corners are distinguished as follows.

When multi-pass machining is performed according to a wire cut electrical discharge machining program, the offset in each machining pass is generally determined by the machining program before the wire starts moving. In the example shown in FIG. 5, the "D1" command code calls up and uses an offset from "offset memory 1" in an offset storage means having the memory configuration shown in FIG. 6.

Machining starts at the machining starting point, and in the first block that cuts into the workpiece to move toward the final shape of the product, the offset is normally first canceled ("G40" command) to prevent erroneous setting of the offset and direction and for other reasons. Then, in the blocks where the workpiece is machined to the product shape, the offset is enabled ("G41" command). In this example, the route along which the wire actually travels is offset to the left from the route given by the machining program. For an offset to the right, a "G42" command code is used instead of the "G41" command.

In the following machining blocks, machining continues with the wire offset to the left by the amount instructed by the "D1" command until another "G40" command code cancels the offset.

After the machining of the product shape starts, the wire passes through corner [1]. At this corner [1], the route bends to the right, i.e., in the direction opposite to the offset. At the next corner [2], the route bends to the left, i.e., in the direction of the offset. When the workpiece is completely machined to the product shape and is taken out, corner [1] is salient and corner [2] is reentrant. More specifically, a corner that bends away from the side on which the wire offset is provided is a salient corner, while a corner that bends toward the side on which the wire offset is provided is a reentrant corner.

The controller for the wire cut electrical discharge machine therefore analyzes the machining program and finds pairs of intersecting straight blocks to identify the positions where corners will be formed. Next, the controller distinguishes whether each corner is a reentrant or salient angular corner by distinguishing whether the corner bends toward or away from the side on which the offset is provided.

Figure 7:
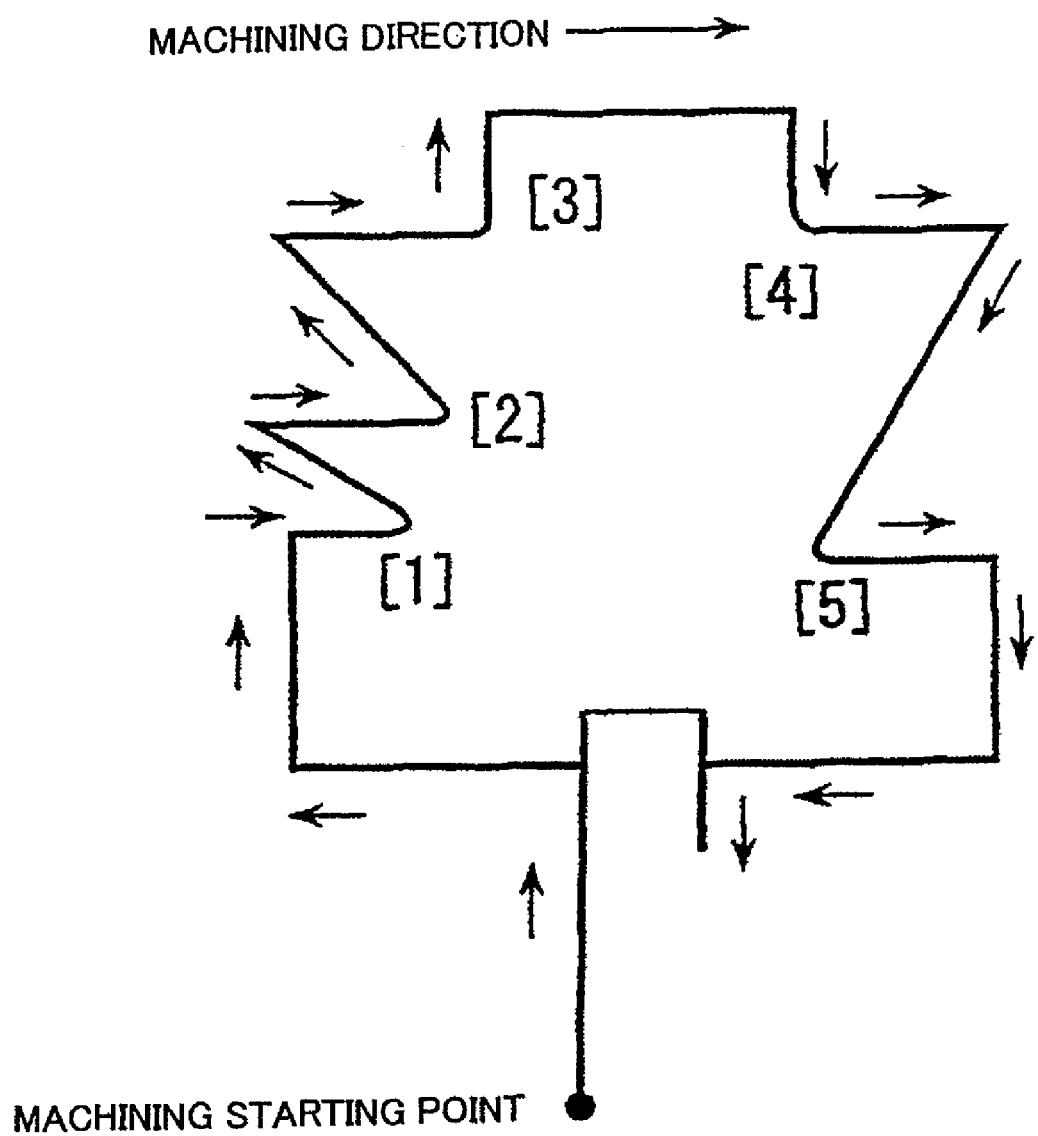
FIG. 7 shows a machined shape with five corner R commands added to the machined shape shown in FIG. 4.

In a corner identified as a reentrant angular corner, the controller must insert a circular arc machining route having the above radius into the machining route corresponding to the two straight blocks intersecting at the reentrant angular corner before the wire actually moves (at least before the wire enters the reentrant angular corner). This will briefly be described with reference to FIGS. 7 and 8. FIG. 7 shows an example of a shape machined when five corner R commands are inserted into the machining program for obtaining the shape shown in FIG. 4. FIG. 8 shows an example of a machining program having five corner R commands inserted.

In a well-known method of coding instructions for a machining route along a circular arc corner, a corner R command is inserted in the reentrant angular corner formed by two intersecting straight blocks to create a machining route following a circular arc block tangent with these straight blocks, and the vertex of the reentrant angular corner and the straight sections preceding and following the vertex are replaced with the created circular arc block.

To modify the machined shape shown in FIG. 4 to the one shown in FIG. 7, five corner R commands "R0.5" are inserted as shown in FIG. 8. "R0.5" is a command that inserts a circular arc motion block (corner R) of 0.5 mm radius into a reentrant angular corner formed by two intersecting straight blocks and replaces the vertex of the reentrant angular corner and the straight sections preceding and following the vertex with the inserted circular arc motion block. More specifically, with this command, a circular arc block and two straight blocks are joined and the two straight block sections between the points of connection of the circular arc block to the straight blocks and the point of intersection (vertex of corner) of the straight blocks are removed to create a machining route following the circular arc motion block.

This technique can be employed in the present invention. As an embodiment of the present invention, a case is considered in which the program shown in FIG. 5 corresponding to the machined shape in FIG. 4 is used. In multi-pass machining, the above corner R command with a radius equal to the difference between the offset for the n-th machining pass and the offset for (n+m)-th (m≧1) machining pass is inserted virtually into the reentrant angular corner.

Here, the above "n-th machining pass" (reference machining pass) is usually determined by design to be a pass in about the first three passes (n=1 to 3) in which the discharge energy is relatively high. The reference machining pass (n-th pass) may be changed according to the machining goal, because the required discharge energy differs depending on the final machining accuracy, surface roughness, and other requirements of the produced workpiece even in the same machining pass. The above "(n+m)-th machining pass" is not limited to the machining pass immediately after the n-th machining pass ((n+1)-th machining pass).

As described above, in one embodiment, the program shown in FIG. 5 corresponding to the machined shape in FIG. 4 is used and, in multi-pass machining, virtual corner R commands with a radius equal to the difference between the offset for the n-th machining pass and the offset for the (n+m)-th machining pass are inserted into the reentrant angular corners. This insertion is carried out in the controller for the wire cut electrical discharge machine.

Figure 9:
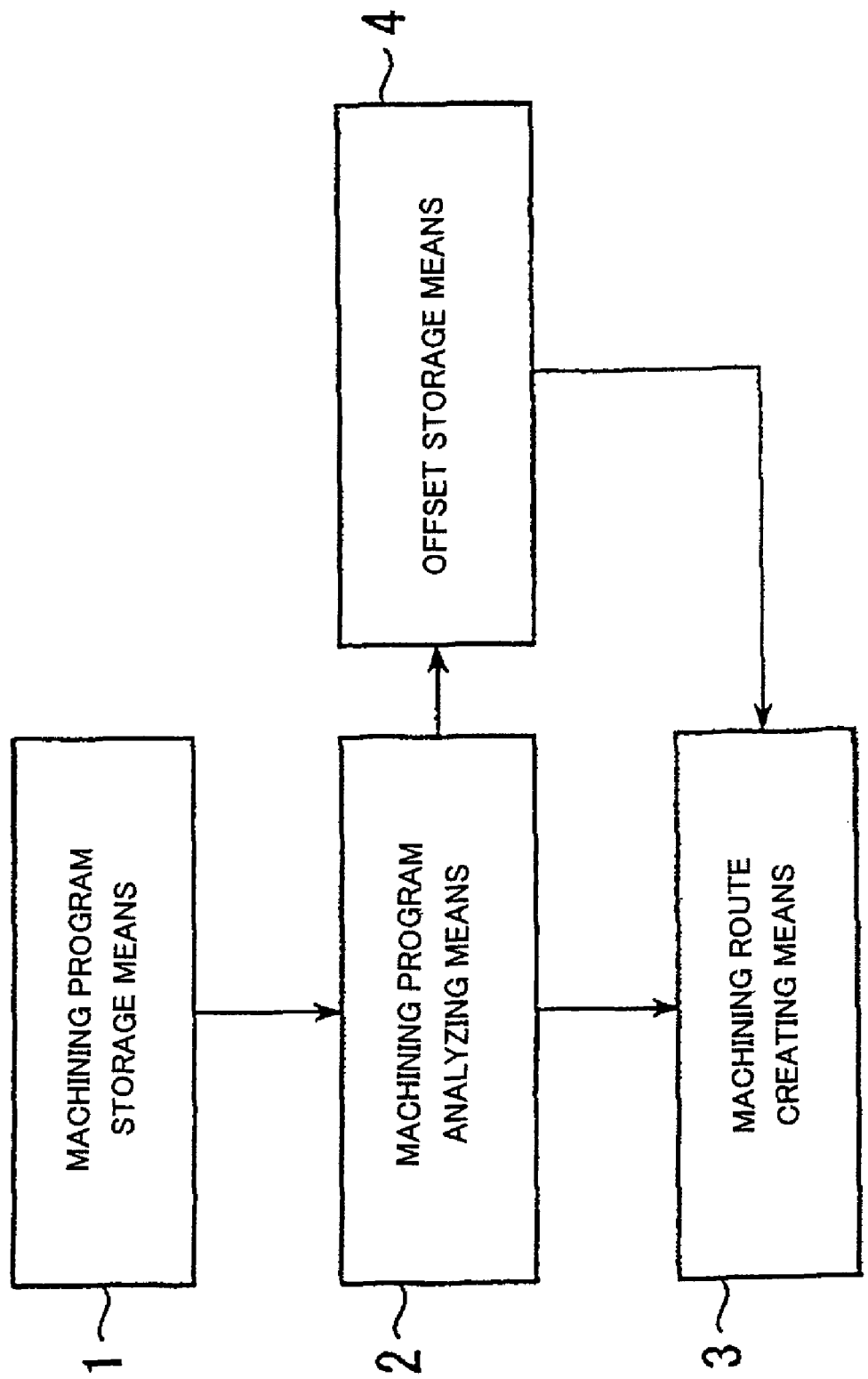
FIG. 9 is a block diagram schematically showing a conventional controller configuration for a wire cut electrical discharge machine.
Figure 10:
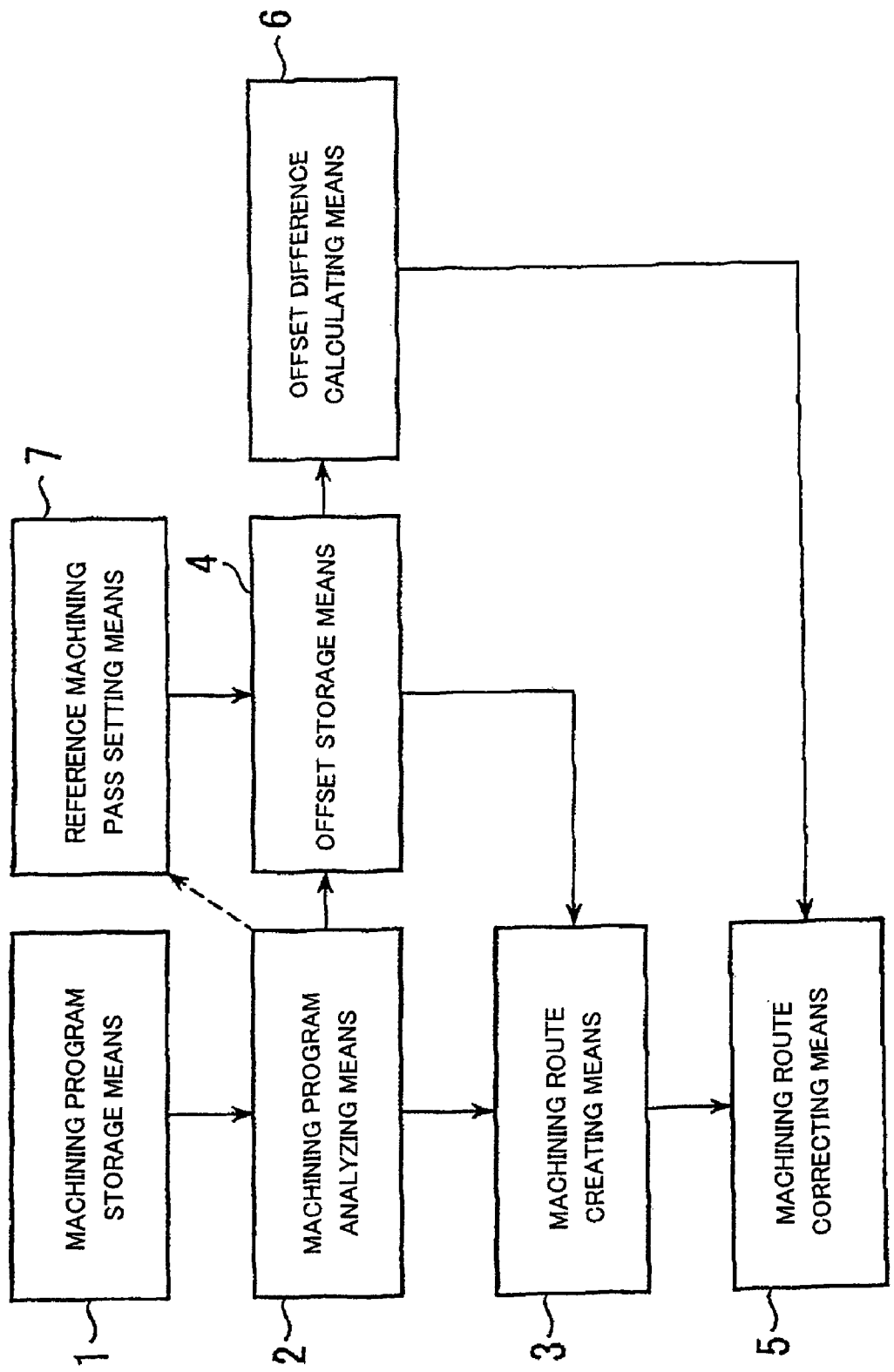
FIG. 10 is a block diagram schematically showing a controller configuration of a wire cut electrical discharge machine in an embodiment of the present invention.

Next, the configuration and functions of the controller will be described with reference to FIG. 9 (showing a conventional controller) and FIG. 10 (showing the controller of the present invention). In FIGS. 9 and 10, components not directly involved in the creation and correction of the machining route are omitted.

First, to clarify the features of the controller for the wire cut electrical discharge machine according to the present invention, the conventional controller for the wire cut electrical discharge machine will be described with reference to FIG. 9.

The controller, as shown in FIG. 9, includes machining program storage means 1, machining program analyzing means 2, machining route creating means 3, and offset storage means 4.

The machining program storage means 1 comprises non-volatile memory elements that store machining programs required for machining. A large number of machining programs are stored in advance in the machining program storage means 1. The machining program analyzing means 2 analyzes a machining program specified by the operator, for example, extracts data relating to the machining route, and passes the data to the machining route creating means 3. The machining program analyzing means 2 also issues instructions for required offsets to the offset storage means 4, based on the offset command codes in the machining program.

The offset storage means 4, which is a memory in which a large number of wire offsets required for machining are stored, selects the offset required for machining in each machining pass in response to instructions from the machining program analyzing means 2 and passes this offset to the machining route creating means 3.

On the basis of the machining route data received from the machining program analyzing means 2 and the offset for each machining pass (first, second, third, and so on) received from the offset storage means 4, the machining route creating means 3 creates the machining route along which the wire actually travels.

The machining procedure using the conventional controller shown in FIG. 9 is as follows. Before machining, the machining program to be executed is stored in advance by the operator in the machining program storage means 1. The offsets are also stored in advance by the operator in the offset storage means.

First, when the operator selects, on a display screen for example, the machining program to be executed from the machining program storage means 1, the machining program is passed from the machining program storage means 1 to the machining program analyzing means 2. The machining program analyzing means 2 analyzes the machining program passed from the machining program storage means 1, extracts data relating to the machining route from the machining program, and passes these data to the machining route creating means 3.

Operating according to the offset command codes, the machining program analyzing means 2 also issues instructions for the required offsets to the offset storage means 4. The offset storage means 4 selects the offsets instructed by the machining program analyzing means 2 and passes them to the machining route creating means 3.

The machining route creating means 3 receives the machining route data from the machining program analyzing means 2 and the offset set for each machining pass from the offset storage means 4 and applies the received offset to the machining route given by the machining program to create the machining route along which the wire actually travels.

If this type of conventional controller is used for multi-pass machining of reentrant angular corners, the machining margin increases in the reentrant angular corners and the expected machining accuracy cannot be achieved.

In view of this, in the embodiment described above, the present invention uses the controller shown in FIG. 10, which can correct the machining route by inserting circular arc motion routes into reentrant angular corners. Compared with the conventional controller shown in FIG. 9, the controller of the present invention further includes machining route correcting means 5, offset difference calculating means 6, and reference machining pass setting means 7. More specifically, the controller of the present invention includes machining route correcting means 5, offset difference calculating means 6, and reference machining pass setting means 7, in addition to the basic configuration including machining program storage means 1, machining program analyzing means 2, machining route creating means 3, and offset storage means 4.

The machining program analyzing means 2 analyzes a machining program specified by the operator, for example, extracts data relating to the machining route, passes these data to the machining route creating means 3, and issues instructions for required offsets to the offset storage means 4, based on offset command codes in the machining program.

In response to the instructions from the machining program analyzing means 2, the offset storage means 4 selects the offset for each machining pass and passes this offset to the machining route creating means 3 and the offset difference calculating means 6. On the basis of the machining route data received from the machining program analyzing means 2 and the offset for each machining pass received from the offset storage means 4, the machining route creating means 3 creates the machining route along which the wire actually travels.

The machining route correcting means 5 creates a corrected machining route by modifying the machining route created by the machining route creating means 3. The machining route correcting means 5 receives the data required for this route correction from the offset difference calculating means 6 and the reference machining pass setting means 7.

The reference machining pass (the value "n" of the "n-th machining pass" described above and shown in FIG. 3) is preset in the reference machining pass setting means 7. This setting may be made by the operator on an operation screen when storing offsets in the offset storage means 4, or from the machining program when giving instructions for the offset as indicated by the dot-dash arrow pointing from the machining program analyzing means 2 to the reference machining pass setting means 7 in FIG. 10. In the latter case, a special "DD" offset command code specifying a reference machining pass and its offset may be provided, for example. If the "DD" code is written into the machining program, then when the machining program analyzing means 2 analyzes the DD code, data relating to the reference machining pass is set in the reference machining pass setting means 7.

The offset difference calculating means 6 reads the offset specified for the reference machining pass (n-th machining pass) set in the reference machining pass setting means 7 and the offset specified for the current machining pass, i.e., the (n+m)-th pass (the m-th pass from the n-th pass, which is the reference machining pass; the (n+m)-th machining pass is the pass in which the machining route is corrected) from the offset storage means 4, calculates the difference between the two offsets, and passes the calculation results to the machining route correcting means 5.

The machining route correcting means 5 receives the calculation results from the offset difference calculating means 6, and corrects the machining route created by the machining route creating means 3 by inserting circular arc motion blocks into the reentrant angular corners formed by pairs of intersecting straight motion blocks to create the intended machining route.

A machining procedure using the controller shown in FIG. 10 is as follows. Before machining starts, the operator stores the machining program to be executed in the machining program storage means 1, the offsets in the offset storage means, and data relating to the reference machining pass in the reference machining pass setting means 7.

First, when the operator selects, on the screen, for example, the machining program to be executed from the machining program storage means 1, the machining program is passed from the machining program storage means 1 to the machining-program analyzing means 2. The machining program analyzing means 2 analyzes the machining program passed from the machining program storage means 1, extracts data relating to the machining route from the machining program, and passes the data to the machining route creating means 3. The machining program analyzing means 2 also issues instructions for the required offsets to the offset storage means 4, on the basis of the offset command codes.

The offset storage means 4 selects the offset instructed by the machining program analyzing means 2 and passes this offset to the machining route creating means 3 and to the offset difference calculating means 6. The machining route creating means 3 receives the machining route data from the machining program analyzing means 2 and the offset set for each machining pass from the offset storage means 4 and applies the offset for each machining pass to the machining route based on the machining program to create the machining route along which the wire actually travels.

The offset difference calculating means 6 receives the offset for each machining pass from the offset storage means 4, determines the difference between the offset for the reference machining pass (n-th machining pass) and the offset for the (n+m)-th machining pass (m-th machining path from the n-th machining pass), and passes the difference to the machining route correcting means 5.

The machining route correcting means 5 inserts the virtual corners R determined from the calculation result received from the offset difference calculating means 6 into the reentrant angular corners in the machining route created by the machining route creating means 3 to create a machining route including these virtual corners R. Accordingly, the straight blocks forming the reentrant angular corners are shortened because the sections preceding and following the vertex of each corner are removed. The removed sections are the sections between the two end points of the inserted circular arc route (the two points of connection to the straight routes). These end points are calculated by the machining route correcting means 5. For example, if the circular arc section is inserted so as to make tangential contact with the two straight routes as illustrated in FIG. 3, the end points are two points of contact.

In the example shown in FIG. 3, a virtual corner R having a radius of curvature equal to the offset difference received from the offset difference calculating means 6 is inserted so as to make tangential contact with the two straight motion blocks. The size of the corner R, however, may be adjusted upward or downward from the offset difference as described above. For example, this adjustment can be made by multiplying the difference by a preset coefficient a (selected from numeric values provided at intervals of 0.1 between $0.5 \leq a \leq 1.2$, for example).

Further improvement in machining performance can be anticipated when removing extra portions remaining due to disturbances such as sagging of the wire if the machining margin is adjusted by inserting a corner R such that the corner R meets the two straight motion blocks discontinuously (i.e., there is no mathematically tangent line).

Figure 11:
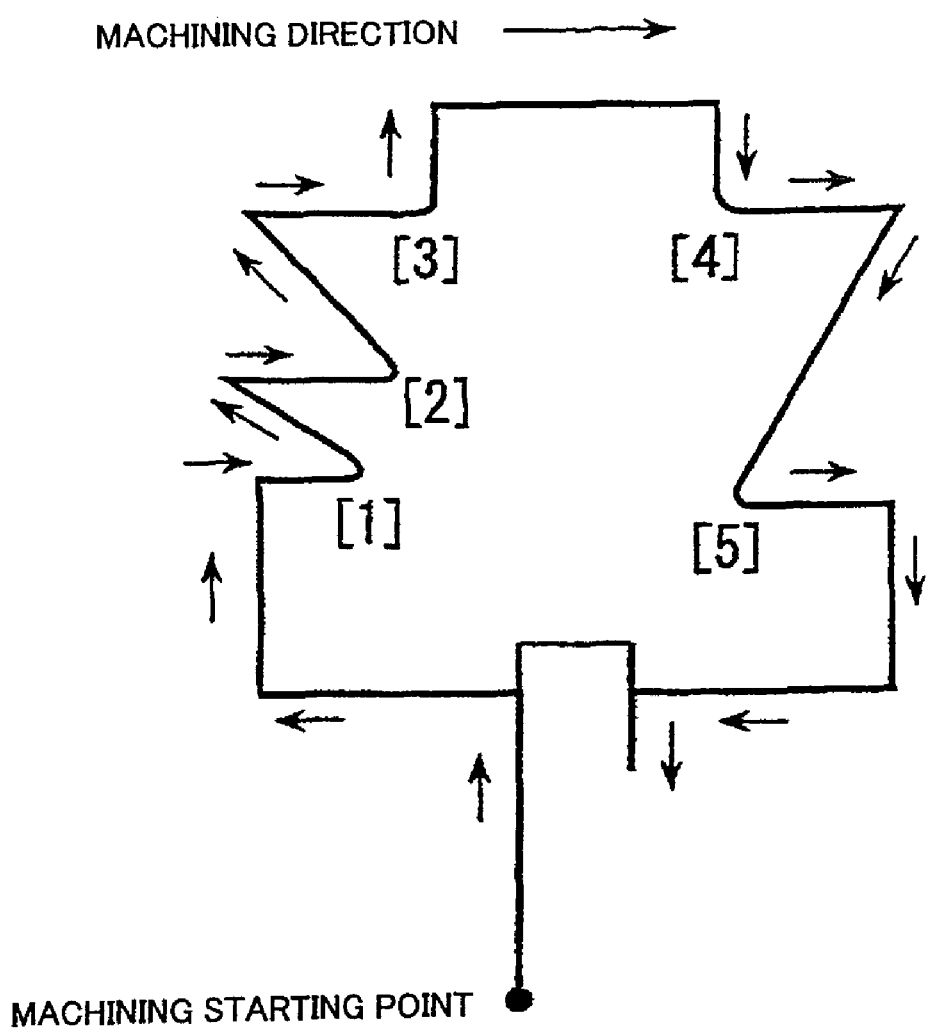
FIG. 11 shows an example of a shape machined by wire cut electrical discharge machining controlled by the controller shown in FIG. 10.

FIG. 11 shows an example of a shape machined by wire cut electrical discharge machining controlled by the controller shown in FIG. 10. FIGS. 12A and 12B shows an example of machining program for obtaining this machined shape.

The program is composed of a main program (as shown in FIG. 12A) and a subprogram (as shown in FIG. 12B). The subprogram is invoked in response to instructions in the main program. The program shown is an example of three-pass machining. The "DD2" command specifies the offset stored in "offset memory 2" (See FIG. 6) as the offset for the reference machining pass. The "D3" command causes the offset difference calculating means 6 to calculate the difference between the offset stored in "offset memory 2" and the offset stored in "offset memory 3" (See FIG. 6). In the third machining pass, virtual corners R having a radius of curvature calculated by the offset difference calculating means 6 (the difference between the offset specified for the second machining pass and the offset specified for the third machining pass) are inserted in the reentrant angular corners [1]-[5] in the machining route, so the workpiece is machined as shown in FIG. 11. The reentrant angular corners are thus machined with high accuracy.

Although in the controller shown in FIG. 10, the machining route creating means 3 creates a machining route and then the machining route correcting means 5 corrects the created machining route by inserting circular arc motion blocks to obtain a machining route with circular arc motion blocks inserted (straight route→circular arc route→straight route), a machining route with circular arc motion blocks inserted may be created by the machining route creating means 3 instead.

Figure 13:
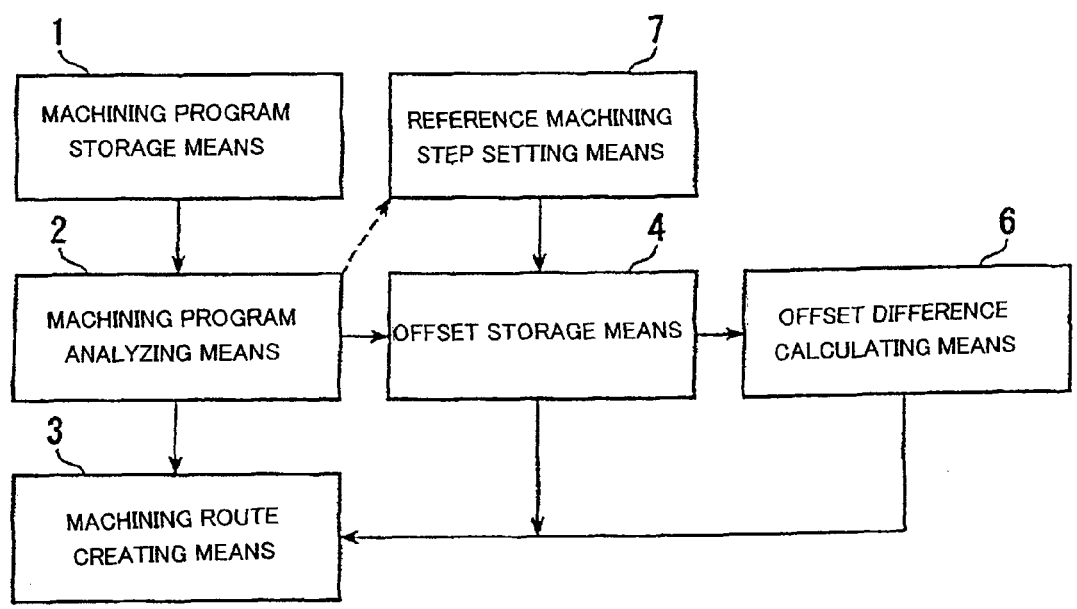
FIG. 13 is a block diagram schematically showing a modified controller configuration for a wire cut electrical discharge machine in another embodiment of the present invention.

A variation of the controller, shown in FIG. 13, is used for this purpose. This controller has a configuration similar to the controller shown in FIG. 10, except that the machining route correcting means 5 is omitted and the machining route creating means 3 differs in function from the machining route creating means 3 shown in FIG. 10.

In the controller shown in FIG. 13, the machining program storage means 1 stores machining programs required for machining. The machining program analyzing means 2 analyzes a machining program specified by the operator, for example, extracts data relating to the machining route, passes these data to the machining route creating means 3, and issues instructions for the required offsets to the offset storage means 4, based on offset command codes in the machining program.

The offset storage means 4, which is a memory that stores a large amount of wire offset data required for machining, selects the offset required for machining in each machining pass in response to an instruction from the machining program analyzing means 2 and passes this offset to the machining route creating means 3 and the offset difference calculating means 6.

In the above embodiment, to designate the machining pass in which circular arc motion blocks are inserted into reentrant angular corners comprising two intersecting straight motion blocks each, a reference machining pass is set in the reference machining pass setting means 7. The first machining pass in which circular arc motion blocks are inserted into reentrant angular corners is in general the reference machining pass plus "m" (where "m" is a positive integer, $m \geq 1$), and "m" is typically one. In the above embodiment, the offset difference calculating means 6 calculates the difference between the offset for the reference machining pass (the n-th machining pass) set by the reference machining pass setting means 7 and the offset set for the (n+m)-th machining pass and passes the calculation result to the machining route creating means 3.

The machining route creating means 3 has functions slightly different from those of the machining route creating means 3 in the controller shown in FIG. 10. More specifically, in the controller shown in FIG. 13, the machining route creating means 3 receives data relating to the machining route from the machining program analyzing means 2, the offset of each machining pass from the offset storage means 4, and the difference calculated by the offset difference calculating means 6 and, on the basis of these data, creates the machining route along which the wire actually travels.

A machining procedure using the controller shown in FIG. 13 is as follows. Before machining starts, the operator stores the machining programs to be executed in the machining program storage means 1, the offsets in the offset storage means, and data relating to the reference machining pass in the reference machining pass setting means 7.

First, when the operator selects, on the screen for example, the machining program to be executed from the machining program storage means 1, the machining program is passed from the machining program storage means 1 to the machining program analyzing means 2. The machining program analyzing means 2 analyzes the machining program passed from the machining program storage means 1, extracts data relating to the machining route from the machining program, and passes these data to the machining route creating means 3. The machining program analyzing means 2 also issues instructions for the required offsets to the offset storage means 4, based on the offset command codes.

The offset storage means 4 selects offsets as instructed by the machining program analyzing means 2 and passes the offsets to the machining route creating means 3 and the offset difference calculating means 6. The offset difference calculating means 6 receives the offset for each machining pass from the offset storage means 4, determines the difference between the offset for the reference machining pass (n-th machining pass) and the offset for the (n+m)-th machining pass (m-th machining path from the n-th machining pass), and passes the difference to the machining route correcting means 3.

The reference machining pass is set by the reference machining pass setting means 7. As described above, this setting may be made by the operator on an operation screen when storing offsets in the offset storage means 4, or from the machining program in the instruction that sets the offset, by providing a special offset command code such as "DD" specifying a reference machining pass and its offset, for example. The dot-dash arrow pointing from the machining program analyzing means 2 to the reference machining count setting means 7 in FIG. 13 indicates a function corresponding to the latter case.

The machining route creating means 3 receives data relating to the machining route from the machining program analyzing means 2 and the offset set for each machining pass from the offset storage means 4, and applies the received offset to the machining route based on the machining program to create the machining route along which the wire actually travels. Virtual corners R with a radius of curvature equal to the offset difference received from the offset difference calculating means 6 are inserted into reentrant angular corners to create a machining route including the virtual corners R. As a result, in the above embodiment, the straight routes corresponding to the two straight blocks forming the reentrant angular corner become shorter than they would be if the corners R were not inserted. More specifically, the straight route sections between the vertex of the reentrant angular corner and the points at which the inserted circular arc route is connected to the straight routes are removed and replaced with the circular arc route. As described above, the two end points of the inserted circular arc route (points of connection of the circular arc route to the straight blocks) are calculated by the machining route creating means 3. When the circular arc route is inserted between and tangent to two straight blocks intersecting in a V shape as shown in FIG. 3 for example, the two ends of the inserted circular arc route are points of contact of the circular arc route to the straight routs.

In the controller shown in FIG. 13, the size (radius of curvature of the arc) of the inserted corners R may be changed by multiplying the offset difference received from the offset difference calculating means 6 by a given coefficient. The circular arc route inserted between the two straight routes intersecting in a V shape need not make tangential contact with the straight blocks. If the straight blocks do not make tangential contact with the circular arc route but intersect it (if the transition from the straight blocks to the circular arc route is discontinuous), there is no problem as long as no portion of the machining margin is left unremoved.

The controller shown in FIG. 13 can execute the same machining programs as shown in FIG. 12, so the reentrant angular corners are machined with high accuracy.

In short, the controller shown in FIG. 13 differs from the controller in FIG. 10 in the following points.

The controller in FIG. 10 has machining route correcting means 5 which inserts circular arc motion blocks into reentrant angular corners to correct the route created by the prior art, thereby obtaining an intended machining route. More specifically, this controller employs the conventional machining route creating method and an additional method for correcting the machining route. Accordingly, in the controller FIG. 10, the intended machining route is created in two stages: the machining route is first created as in the prior art, and the created machining route is then corrected by the machining route correcting means 5.

In contrast, in FIG. 13, instead of correcting the machining route created by existing methods, the machining route creating means 3 incorporates circular arc motion blocks into the machining route as it is created. Accordingly, the controller in FIG. 13 has the advantage that the intended machining route can be created in one stage.

The controller in FIG. 13 can create a machining route passing through virtual corners R by inserting the virtual corners R into the machining program analyzed by the machining program analyzing means 2. Further, the controller also can edit the machining program analyzed by the machining program analyzing means 2 by automatically inserting circular arc motion blocks into the machining program so as to actually create a machining program including circular arc motion blocks. Accordingly, the controller in FIG. 13 can create a machining route so effectively as in the case where the controller in FIG. 10 creates a machining route, thereby causing any problems.

Figure 14:
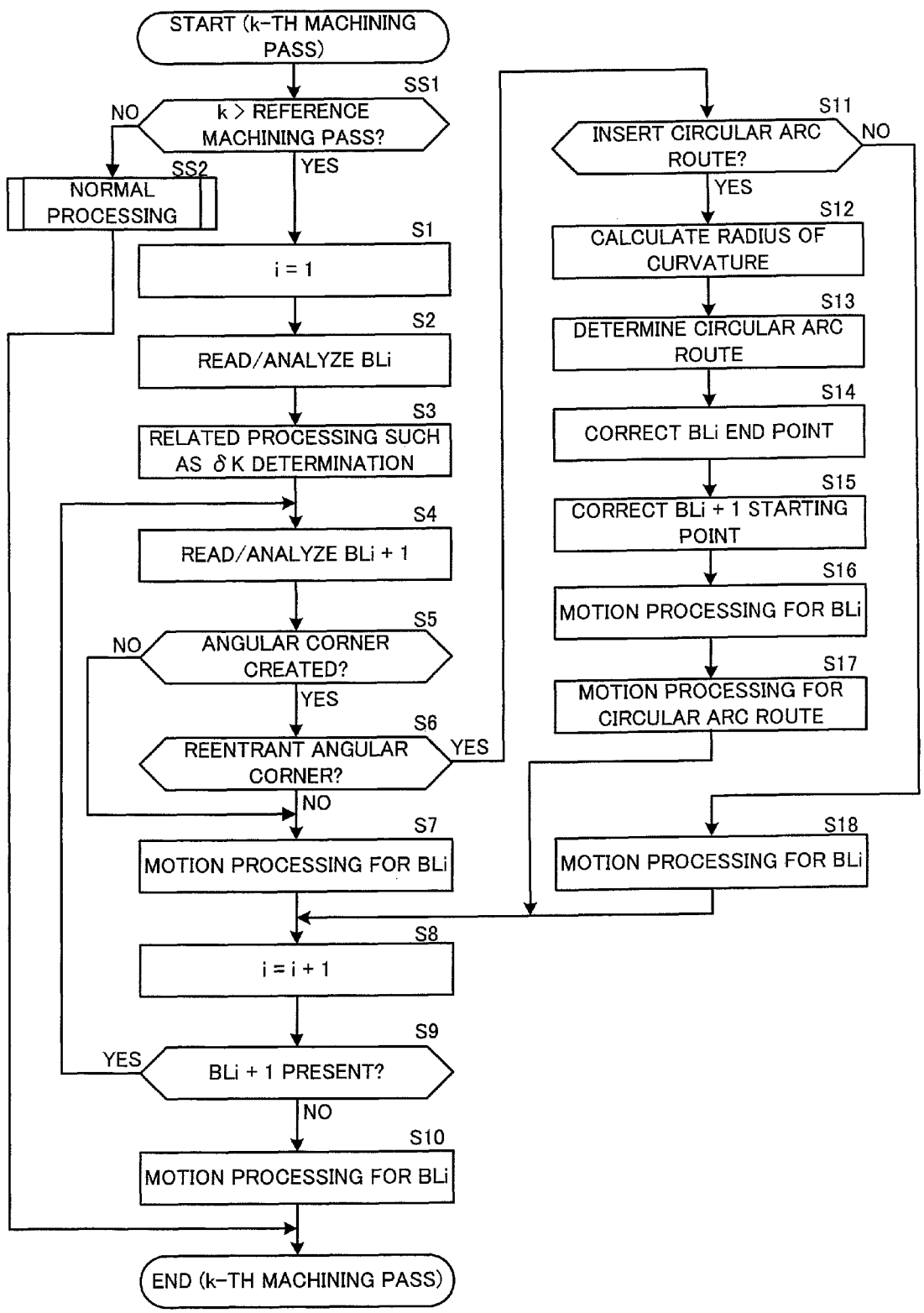
FIG. 14 is a flowchart outlining the steps of multi-pass machining for obtaining a machined shape including reentrant angular corners, referring in particular to the steps for inserting circular arc routes.

Finally, a typical processing flow will be described with reference to FIG. 14 which represents the case in which the machining program specifies multi-pass machining using the controller shown in FIG. 10 or 13 to obtain a shape including reentrant angular corners. FIG. 14 is a flowchart illustrating the processing for the k-th machining pass (k=1, 2 . . . k final, "k final" being the final machining pass) in such multi-pass machining, referring in particular to the processing relating to the insertion of circular arc routes.

In the flowchart in FIG. 14, BL denotes a block and "i" is an index (register value) indicating the block number. For example, BLi denotes the i-th motion block. Each step is summarized below.

The current (k-th) machining pass is checked to see if it is beyond the reference machining pass (n-th machining pass) (step SS1). If so (k>n), process proceeds to step S1. Otherwise (k≦n), process proceeds to step SS2, in which the k-th machining pass is performed by normal processing (step SS2) and the k-th pass ends. The ordinal number of the current machining pass can be recognized if, for example, a machining pass index (register value) is appropriately set, although this is not illustrated in the flowchart. It is assumed here that the reference machining pass (n-th machining pass) is set in advance by a parameter in the reference machining pass setting means 7.

In step SS2, in which the k-th machining pass is performed by normal processing, each motion block and its associated data (such as data relating to the offset δk for the k-th machining pass) are read while the k-th machining pass is being performed along a motion route which is shifted by the offset δk. In this machining pass, no circular arc routes are inserted even if there are reentrant angular corners. Since this processing is the normal processing, a detailed description will be omitted.

In step S1, the index "i" is initialized (i=1), and the i-th (i.e., first) motion block BL1 is read, together with its associated data (data relating to the offset δk etc. for the k-th machining pass), and analyzed (step S2). Based on the reading and analysis results in step S2, related processing is performed as required (step S3). During this processing, the offset ok is determined (the offset storage means 4 is accessed and data relating to the specified offset δk is captured).

The (i+1)-th motion block BLi+1 (second motion block in the first processing cycle) is now read, together with associated data (step S4), and analyzed. Then, it is determined whether or not the i-th motion block BLi forms an angular corner together with the following (i+1)-th motion block BLi+1 (step S5). If motion blocks BLi and BLi+1 are straight motion blocks that are not mutually parallel, they will form an angular corner. In this case (YES in step S5), process proceeds to step S6; otherwise (NO in step S5), process proceeds to step S7.

In step S6, the angular corner formed by the i-th motion block BLi and the (i+1)-th motion block BLi+1 is determined to be either a reentrant or a salient angular corner. This determination is made as described before. Here, it is determined, from the outer product of the vector representing the motion block BLi (its sense coinciding with the direction of motion) and the vector representing the motion block BLi+1 (its sense coinciding with the direction of motion), whether the wire will turn left or right at the angular corner, and a check is made to see whether the route along which the wire actually travels is offset to the left or right by the offset δk; the angular corner is thereby determined to be a reentrant or salient angular corner.

If it is determined in step S6 that the route from motion block BLi to the next motion block BLi+1 turns left at the angular corner and the offset δk is set on the left side of the specified route in the direction of travel, then the angular corner is determined to be reentrant and process proceeds to step S11. Otherwise, the angular corner is determined not to be reentrant and process proceeds to step S7.

In step S7, processing for motion according to the i-th motion block BLi is performed (which include processing of interpolation, motion commands to each axis servo, etc.). As described later, a motion block to be treated in this pass may have its starting point corrected in step S15; in this case, motion processing is performed on the modified motion block with the corrected starting point. After the motion processing for motion block BLi is completed in step S7, process proceeds to step S8.

If the angular corner is determined to be reentrant in step S6, the reentrant angular corner is checked to see if a circular arc motion block should be inserted (step S11). The criterion of whether a circular arc motion block should be inserted or not is specified in the machining program. In the above example, the reentrant angular corners with R commands require the insertion of circular arc motion blocks.

Next, the radius of curvature of the circular arc routes to be inserted in the reentrant angular corners is calculated (step S12) as described above. More specifically, the difference between the offset for the reference machining pass (n-th machining pass) set in the reference machining pass setting means 7 and the offset for the following (n+m)-th machining pass (for example, the current machining pass) is calculated and the radius of curvature is determined from the calculated difference. For example, the difference may be set equal to the radius of curvature.

The position of the circular arc route to be inserted is determined on the basis of the calculation result in step S12 (step S13). For example, the position of a circular arc that has the radius of curvature calculated in step S12 and makes tangential contact with the two straight routes (already shifted by the offset δk) forming the reentrant angular corner is calculated and the position of the arc center and the positions of the points of contact of the circular arc with the two straight lines forming the reentrant angular corner are determined.

Setting the circular arc route at the position determined in step S13 removes the V-shaped beak projecting ahead of the circular arc route. The end point of the i-th motion block BLi and the starting point of the straight route of the (i+1)-th motion block BLi+1 are corrected (steps S14 and S15) so that the two ends of this removed V-shaped beak section become the end point of motion block BLi and the starting point of motion block BLi+1.

As already described, the processing in steps S12 to S15 may be performed as a correction of the machining route created from the motion blocks BLi and BLi+1 (corresponding to the block configuration in FIG. 10), or as a part of the processing for creating the machining route (corresponding to the block configuration in FIG. 13).

The motion processing for the i-th motion block BLi is now performed, involving interpolation, motion commands to each axis servo, etc. (step S16). The motion block BLi processed in step S16 is the modified block having the end point corrected in step S14.

Next, the motion processing for the inserted circular arc motion block (including interpolation, motion commands to each axis servo, etc.) is performed (step S17). After this processing, process proceeds to step S8.

If it is found unnecessary to insert a circular arc motion block into the reentrant angular corner in step S11, the motion processing for the i-th motion block BLi is performed, including processing of interpolation, motion commands to each axis servo, etc. (step S18). The motion block processed in step 18 is the unmodified motion block BLi having end points not corrected in step S14. After this processing, process proceeds to step S8.

In step S8, the index "i" is incremented by one (i=i+1). Then, a check is made to see if next motion block ((i+1)-th motion block) BLi+1 is present. If not, process proceeds to step S10; otherwise, process returns to step S4. In the first processing in step S9, "i" is 2, so that a check is made to see if a third motion block is present.

In step S10, the motion processing for the i-th motion block (the final motion block) is performed (including interpolation, motion commands to each axis servo, etc.). The motion block BLi processed in step S10 may have had its starting point corrected in step S15; in that case, the motion processing in step S10 is applied to the modified motion block BLi with the corrected starting point.

In step S10, motion processing for the final motion block is performed and the current (k-th) machining pass ends.

If the above processing is repeated for k=1, 2, . . . , k final, circular arc routes having a radius of curvature determined from the difference between the offset for the reference machining pass and the offset for the next or a later machining pass are inserted into the reentrant angular corners requiring route modification including the insertion of circular arc routes (the straight sections forming the reentrant angular corners are shortened) and the machining route is established.

For example, if the third machining pass is set as the reference machining pass, the fourth machining route is established by inserting circular arc routes having a radius of curvature determined from the difference between the offset δ3 for the third machining pass and the offset δ4 for the fourth machining pass into reentrant angular corners. Similarly, if the third machining pass is set as the reference machining pass, the fifth machining route is established by inserting circular arc routes having a radius of curvature determined from the difference between the offset δ3 for the third machining pass and the offset δ5 for the fifth machining pass into reentrant angular corners.

The invention claimed is:

1. A controller for controlling multi-pass machining by a wire cut electrical discharge machine, the controller comprising:
machining program storage means for storing a machining program;
machining program analyzing means for analyzing the machining program stored in said machining program storage means;
offset storage means for storing a wire offset set for each machining pass;
machining route creating means for creating a machining route on the basis of the result of analysis by said machining program analyzing means and the offset stored in said offset storage means;
machining route correcting means for correcting the machining route at a reentrant angular corner formed by two straight motion blocks in said machining route, the straight motion blocks being not parallel to each other;
reference machining pass setting means for setting a reference machining pass to determine a machining pass for initiating said machining route correction by said machining route correcting means; and offset difference calculating means for calculating a difference between the offset for said reference machining pass and the offset for a machining pass one or more passes after the reference machining pass;

wherein said machining route correcting means corrects the machining route created by said machining route creating means by removing, from the two straight motion blocks forming the reentrant angular corner, sections adjacent to the vertex of the reentrant angular corner and inserting, in place of the removed sections, a circular arc motion block having a radius of curvature determined on the basis of the result of calculation by said offset difference calculating means.

2. The controller according to claim 1, wherein said circular arc motion block has a radius of curvature equal to the offset difference calculated by said offset difference calculating means.

3. The controller according to claim 2, wherein said circular arc motion block is inserted into said machining route so as to make tangential contact with said two straight motion blocks.

4. The controller according to claim 1, wherein said circular arc motion block is inserted into said machining route so as to make tangential contact with said two straight motion blocks.

5. A controller for controlling multi-pass machining by a wire cut electrical discharge machine, the controller comprising:

machining program storage means for storing a machining program;

machining program analyzing means for analyzing the machining program stored in said machining program storage means;

offset storage means for storing a wire offset set for each machining pass;

reference machining pass setting means for setting a reference machining pass to determine a machining pass in which to start removing, from two intersecting straight motion blocks of a reentrant angular corner formed by the two straight motion blocks specified by said machining program, sections adjacent to the vertex of the reentrant angular corner and inserting, in place of the removed sections, a circular arc motion block;

offset difference calculating means for calculating a difference between the offset for said reference machining pass and the offset for a machining pass one or more passes after the reference machining pass; and machining route creating means for receiving the offsets stored in said offset storage means and the result of analysis by said machining program analyzing means, and creating a machining route by removing, from the two straight motion blocks forming said reentrant angular corner, sections adjacent to the reentrant angular corner, and inserting, in place of the removed sections, a circular arc motion block having a radius of curvature determined on the basis of the result of the calculation by said offset difference calculating means.

6. The controller according to claim 5, wherein said circular arc motion block is inserted into said machining route so as to make tangential contact with said two straight motion blocks.

7. The controller according to claim 5, wherein said circular arc motion block has a radius of curvature equal to the offset difference calculated by said offset difference calculating means.

8. The controller according to claim 7, wherein said circular arc motion block is inserted into said machining route so as to make tangential contact with said two straight motion blocks.

9. A controller for controlling multi-pass machining by a wire cut electrical discharge machine, the controller comprising:

a machining program storage for storing a machining program;

a machining program analyzing unit for analyzing the machining program stored in said machining program storage;

an offset storage for storing a wire offset set for each machining pass;

a machining route creating unit for creating a machining route on the basis of the result of analysis by said machining program analyzing unit and the offset stored in said offset storage;

a machining route correcting unit for correcting the machining route at a reentrant angular corner formed by two straight motion blocks in said machining route, the straight motion blocks being not parallel to each other;

a reference machining pass setting unit for setting a reference machining pass to determine a machining pass for initiating said machining route correction by said machining route correcting unit; and an offset difference calculating unit for calculating a difference between the offset for said reference machining pass and the offset for a machining pass one or more passes after the reference machining pass;

wherein said machining route correcting unit is configured to correct the machining route created by said machining route creating unit by removing, from the two straight motion blocks forming the reentrant angular corner, sections adjacent to the vertex of the reentrant angular corner and inserting, in place of the removed sections, a circular arc motion block having a radius of curvature determined on the basis of the result of calculation by said offset difference calculating unit.

* * * * *